United States Patent [19]

Uomori et al.

[11] Patent Number: 5,046,179

[45] Date of Patent: Sep. 3, 1991

[54] CORRELATION COMPUTING DEVICE FOR IMAGE SIGNAL

[75] Inventors: Kenya Uomori, Katano; Hirofumi Ishii, Moriguchi; Atsushi Morimura, Nara, all of Japan

[73] Assignee: Matsushita Electric Industrial Co., Ltd., Osaka, Japan

[21] Appl. No.: 490,420

[22] Filed: Mar. 8, 1990

[30] Foreign Application Priority Data

Mar. 14, 1989 [JP] Japan .................................. 1-61781

[51] Int. Cl.$^5$ .......................................... G06F 15/336
[52] U.S. Cl. ................................. 364/728.03; 382/42
[58] Field of Search ...................... 382/9, 42, 54, 34; 364/728.03, 745; 375/26

[56] References Cited

U.S. PATENT DOCUMENTS 4,727,506  2/1988  Fling ................................. 364/745
4,864,629  9/1989  Deering .............................. 382/42

FOREIGN PATENT DOCUMENTS

61-269475  11/1985  Japan .

Primary Examiner—David L. Clark
Assistant Examiner—Long T. Nguyen
Attorney, Agent, or Firm—Stevens, Davis, Miller & Mosher

[57] ABSTRACT

A correlation computing device includes a higher-order bit elimination circuit which receives a digital input image signal and provides an output signal in which higher-order bits up to 50% have been eliminated as a maximum word length of a digital input image signal. A representative point preservation memory temporarily stores the output signal from the higher-order bit elimination circuit. A correlation determining circuit determines a correlation between a signal stored in the representative point preservation memory and the output signal from the higher-order bit elimination circuit. A minimum-value address decision circuit selects a minimum value of the correlation determined by the correlation determining circuit and determines a motion vector for the digital input image signal.

4 Claims, 7 Drawing Sheets

| MSB | LSB | 4BIT | 8BIT |
|---|---|---|---|
| 0001 | 1011 | 11 | 27 |
| 0001 | 1010 | 10 | 26 |
| 0001 | 1001 | 9 | 25 |
| 0001 | 1000 | 8 | 25 |
| 0001 | 0111 | 7 | 23 |
| 0001 | 0110 | 6 | 22 |
| 0001 | 0101 | 5 | 21 |
| 0001 | 0100 | 4 | 20 |
| 0001 | 0011 | 3 | 19 |
| 0001 | 0010 | 2 | 18 |
| 0001 | 0001 | 1 | 17 |
| 0001 | 0000 | 0 | 16 |
| 0000 | 1111 | 15 | 15 |
| 0000 | 1110 | 14 | 14 |
| 0000 | 1101 | 13 | 13 |
| 0000 | 1100 | 12 | 12 |
| 0000 | 1011 | 11 | 11 |
| 0000 | 1010 | 10 | 10 |
| 0000 | 1001 | 9 | 9 |
| 0000 | 1000 | 8 | 8 |
| 0000 | 0111 | 7 | 7 |
| 0000 | 0110 | 6 | 6 |
| 0000 | 0101 | 5 | 5 |
| 0000 | 0100 | 4 | 4 |
| 0000 | 0011 | 3 | 3 |
| 0000 | 0010 | 2 | 2 |
| 0000 | 0001 | 1 | 1 |
| 0000 | 0000 | 0 | 0 |

4-BIT DATA AFTER ELIMINATION OF HIGH-ORDER 4BITS

8-BIT DATA (ORIGINAL DATA)

DECIMAL EXPRESSION OF SIGN-LESS BINARY NUMERALS

CORRELATION COMPUTING DEVICE FOR IMAGE SIGNAL

BACKGROUND OF THE INVENTION

1. Field of the Invention

This invention relates to a correlation computing device which determines correlation between image data from, for example, two successive television image fields (or frames) on the basis of an absolute difference computing operation between the image data.

2. Description of the Prior Art

An image motion vector detecting apparatus using a prior art correlation computing device is disclosed in, for example, JP-A-61-269475.

Figure 7:
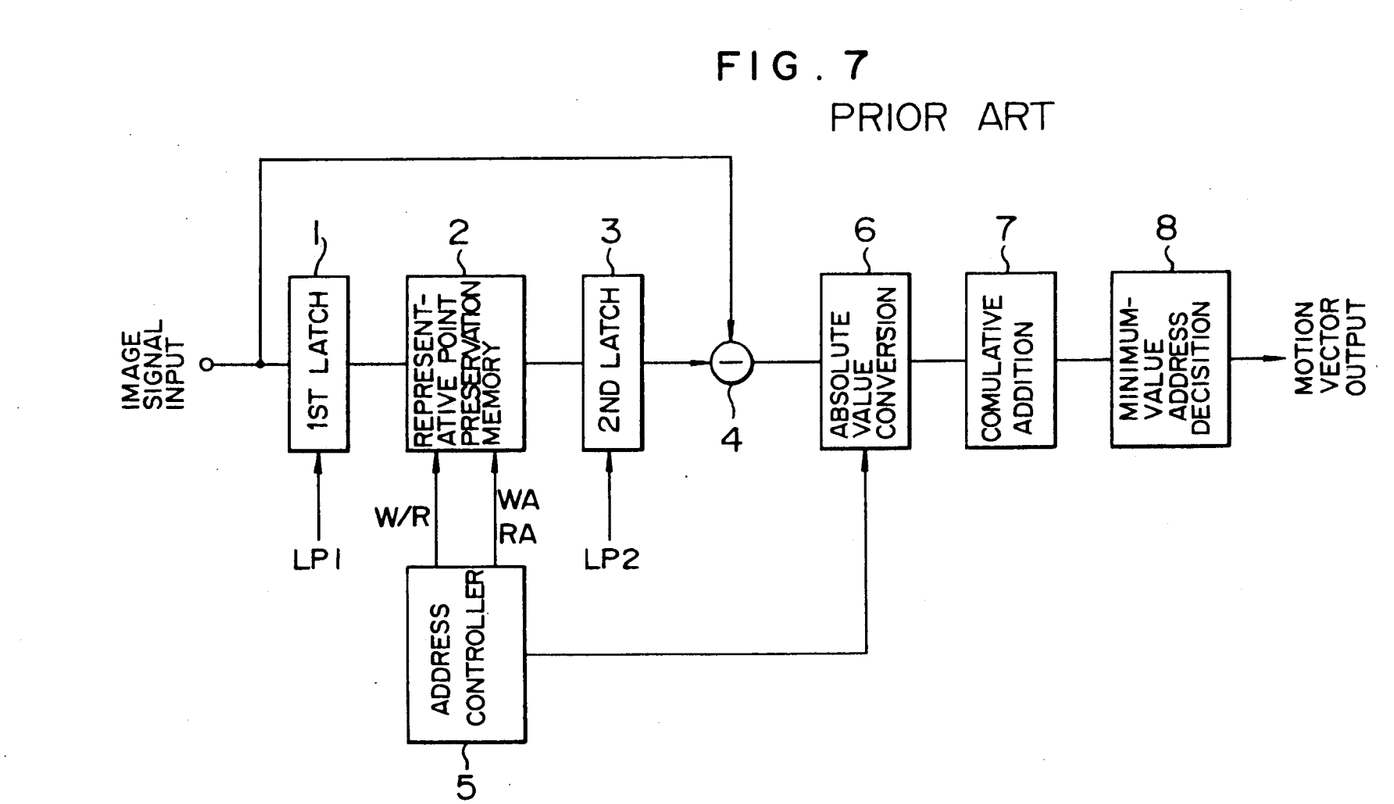
FIG. 7 is a block diagram of an image motion vector detecting apparatus using a prior art correlation computing device.

FIG. 7 shows schematically the structure of the disclosed image motion vector detecting apparatus using the prior art correlation computing device in which an absolute difference between image data is computed so as to determine correlation between an image picked up at one moment and that picked up at the next moment. Referring to FIG. 7, the disclosed image motion vector detecting apparatus comprises a first latch 1, a representative point preservation memory 2, a second latch 3, a subtractor 4 (which may be replaced by an adder), an address controller 5, an absolute value conversion circuit 6, a cumulative adder 7, and a minimum-value address decision 8. An image input signal is applied to the latch 1 and also to the subtractor 4, and a motion vector output signal appears from the minimum-value address decision circuit 8. Timing signals LP1 and LP2 are externally applied to the first latch 1 and the second latch 3, respectively. A write/read control signal W/R is applied from the address controller 5 to the representative point preservation memory 2 to control image data writing and reading. The address controller 5 applies also a write address signal WA and a read address signal RA to the memory 2 for the purpose of address setting. The address controller 5 applies also a control signal to the cumulative adder 7.

The image motion vector detecting apparatus using the prior art correlation computing device detects an image motion vector in a manner which will be described with reference to FIGS. 8A, 8B, 8C and FIGS. 9A, 9B.

First, what is called an image motion vector will be described with reference to FIGS. 8A, 8B and 8C.

Figure 8A:
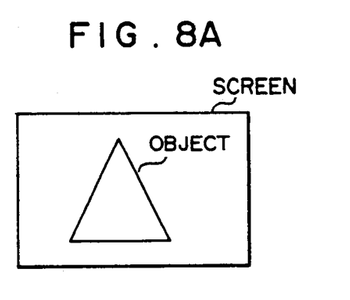
FIGS. 8A, 8B and 8C illustrate an image motion vector.
Figure 8B:
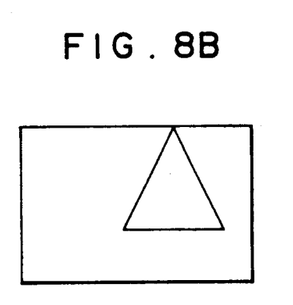
Figure 8C:
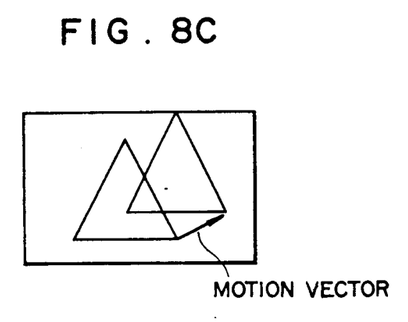

FIG. 8A shows an image of an object picked up at one moment by means of an image pick-up device such as a TV camera. FIG. 8B shows the same image after a period of one field or one frame. That is, the image makes a translational displacement due to the movement of the image pick-up device. In FIG. 8C, the amount of the translational displacement of the image is indicated by the arrowed line segment, and a vector representation of the above displacement of the image is called an image motion vector.

Figure 9A:
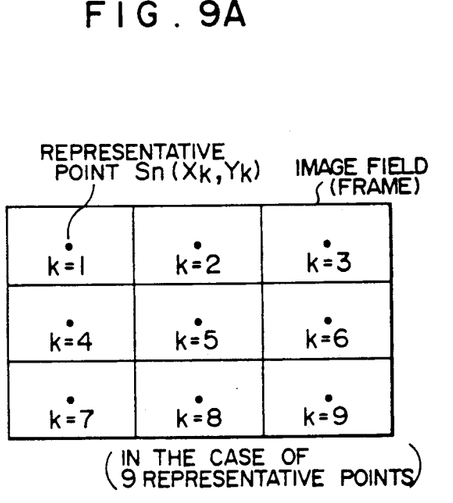
FIG. 9A is a diagrammatic view showing a plurality of representative points selected on a image frame for detecting a motion vector according to the so-called representative point matching method.
Figure 9B:
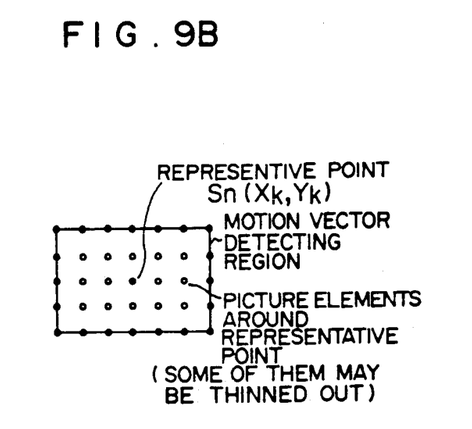
FIG. 9B shows picture elements distributed around the representative point in each motion vector detecting region.

A so-called representative point matching method is most commonly employed so as to detect an image motion vector. FIG. 9A shows a plurality of representative points (9 points are illustrated) and the respective motion vector detecting regions selected in an image field (or frame) according to the representative point matching method. FIG. 9B shows picture elements distributed around the representative point in one of the motion vector detecting regions.

According to the representative point matching method, the image motion vector is detected by finding, with the correlation calculation between the previous and the present fields (or frames), the location in the present field (or frame) to which an image has moved from the location of the representative point in the previous field (or frame) the image having been located.

Referring to FIGS. 9A and 9B, a further detailed description of the representative point matching method will be given.

First, an absolute difference between the image data $S_{n-1}(X_k, Y_k)$ of the representative point at a coordinate $(X_k, Y_k)$ in the (n−1)th field (or frame) and the image data $S_n(X_{k+i}, Y_{k+j})$ of a picture element at a coordinate $(X_{k+i}, Y_{k+j})$ around the representative point within k-th moving vector detecting region in the n-th field (or frame) is calculated, where k is the serial number for appointing a representative point, i and j are coordinate differences between the representative point and a picture element of attention, where the variable ranges of i and j correspond to the range within which a motion vector is detected, and n denotes discrete time. The above absolute difference calculation is performed between the representative point and each of the surrounding picture elements in the respective motion vector detecting regions. Then, the absolute differences, calculated for each picture element at the location having the same coordinate values on the relative coordinates fixed to the representative points in the respective moving vector detecting regions, are added together. In the case of FIG. 9A, as there are 9 representative points, the above cumulative addition is carried out for 9 absolute difference data on each picture element. This cumulative addition operation results in a set of correlations P (i, j), the number of which is equal to the number of picture elements included in one motion vector detecting region.

The arithmetic operations described above can be written in the following formula:

$$P(i,j) = \Sigma |S_{n-1}(X_k, Y_k) - S_n(X_{k+i}, Y_{k+j})| \qquad (1)$$

where $\Sigma$ indicates a summation operation within the variable range of suffix number k, which varies from 1 to the number of the representative points in one image field (or frame), 9 in the case of FIG. 9A.

The correlation values P(i, j) are thus obtained, and a small P(i, j) value indicates a high correlation, a high P(i, j) value indicates a low correlation. Since the input signals are of the two pictures the one of which has resulted from a translation displacement of the other, there is only one state in which these two pictures can be overlapped each other. The overlapping state of the two pictures is detected by finding the coordinate (i, j) where a P(i, j) has a minimum value. Then, the image motion vector V is given as the coordinate value (i, j). Accordingly, the motion vector is determined with the following operation:

$$V(i,j) = (i,j) \text{ for min } \{P(i,j)\} \qquad (2)$$

where "min" shows an operator for selecting the minimum. A method for determining the motion vector with above-mentioned arithmetic operations is called the representative point matching method.

The operation of the image motion vector detecting apparatus using the prior art correlation computing device will now be described with reference to FIG. 7 and FIGS. 9A, 9B.

Image data $S_{n-1}(X_k, Y_k)$ appearing at the k-th representative point in the (n−1)th field (or frame) is supplied to the latch 1 with the timing of the timing pulse signal LP1, and, under control of the write control signal WA, written in and stored at the corresponding addresses for respective k values in the representative point preservation memory 2. In the n-th field (or next frame), the difference between the image data $S_n(X_{k+i}, Y_{k+j})$ for each picture element around the k-th representative point and the image data $S_{n-1}(X_k, Y_k)$ stored in the representative point preservation memory 2 is computed by the subtractor 4, and the absolute value conversion circuit 6 generates the absolute difference and supplies the absolute difference data to the cumulative adder 7, by which the absolute difference data calculated for each picture element at a location having the same coordinate value (i, j) on the relative coordinates fixed to the representative points in respective motion vector detecting regions are added together. After completion of the cumulative addition of the absolute difference data for all the motion vector detecting regions, a set of cumulative absolute differences, or correlations, P(i, j) are obtained, and the minimum-value address decision circuit 8 decides the location (i, j) where the minimum value of P(i, j) is held in the cumulative adder 7. In the case of the decision of correlation on the basis of the cumulative absolute difference P(i, j), the higher the correlation, the smaller the value of P(i, j). Therefore, when the position (address) of each of the representative points is taken as the reference, the distance and direction between the representative point and the position (address) where the cumulative absolute difference P(i, j) exhibits the minimum value indicates the motion vector. The above operation is done in each field (or frame). Therefore, the function of the first latch 1 is to hold the image data for each of the representative points in one field (or frame), while the computation of the correlation in the preceding field (or frame) is being performed. Also, the function of the second latch 3 is to hold the image data for the representative points so that they can be used for computing the correlation between image data of the representative points and picture elements around them in the respective motion vector detecting regions.

However, in the prior art structure described above, a memory capacity of 12 bits per word is required in the process of cumulative addition, in case of an 8-bit data signal, and 16 representative points. Also, a word length of 8 bits is required for the image data processing in the stage before the absolute value conversion circuit 6. Thus, in order to enhance the motion vector detection accuracy, the circuit scale becomes inevitably large with the increase in the number of representative points, and this is disadvantageous for the purpose of integration of the circuit into, for example, an LSI. Further, the prior art structure has an additional problem in that the elimination of low-order bits of the input signal for decreasing the word length results in reduced accuracy of motion vector detection.

SUMMARY OF THE INVENTION

With a view to solve the prior art problems pointed out above, it is an object of the present invention to provide an improved correlation computing device which can reduce the circuit scale without lowering the accuracy of motion vector detection.

The correlation computing device of the present invention which attains the above object comprises a high-order bit eliminating circuit eliminating high-order bits out of a digital input signal, a subtractor and an absolute value conversion circuit, thereby computing correlation between digital input signals of two successive image fields (or frames).

Practically, the proposed correlation computing device decreases word length by eliminating high-order bits out of digital input signal. In conventional methods so far, decrease of word length has been done by eliminating low-order bits. However, the accuracy of the calculation is lowered. Therefore, in this invention, loss of accuracy is prevented by employing a high-order bit elimination, in which an overflow of data does not occur so far as the required word length of the output of the absolute value conversion circuit does not exceed the decreased word length with the high-order bit elimination (as explained in the embodiments described hereinbelow).

Since the regions for computing the correlation between image frames are relatively small, and since there exist strong correlation between spatially adjacent image data, rarely having steep changes because of the statistical characteristics of image data signals, the outputs of the absolute value conversion circuit are generally kept small, and therefore, the probability of occurrence of data overflow is kept small. Further, the correlation is not calculated with a single operation, but a statistical calculation (actually, it is a cumulative addition) of a plurality of intermediate results of operations is included, so that influence of the rarely occurring overflows upon the accuracy of calculated correlation values can be substantially negligible.

In addition, a filtering treatment of input signal, before high-order bit elimination, gives good results, because the filtering treatment can decrease the probability of data overflow in the output of the absolute value conversion circuit. A low-pass filter circuit, a high-pass filter circuit, or a band-pass filter circuit are usable for this purpose.

With a low-pass filter circuit, attenuating high frequency components of input signal, an intra-frame smoothing effect is obtained. In other words, the difference of image signal values between two picture elements within a small distance is lessened, so that probability of data overflow is decreased, even when a large (i, j) in the formula (1) is taken.

With a high-pass filter circuit, attenuating low frequency components down to the direct current component of input signal, an inter-frame smoothing effect is obtained. In other words, direct current component in each frame is eliminated regardless of its magnitude, so that an abrupt change in the average level of image signal of from one frame to another due to phenomenon such as a flickering illumination is eliminated, and the probability of data overflow is also decreased.

With a band-pass filter circuit, extracting intermediate frequency components from input signal, a combination of both effects mentioned above is obtained.

According to the construction of the present invention, a reduction of the circuit scale can be attained without lowering the accuracy in the correlation computation for detecting the image motion vector, using a high-order bit elimination out of input signal combined with calculation of absolute difference from which the correlation is calculated. With the high-order bit elimination, the probability of data overflow is substantially negligible, since the correlation calculation is carried out for a small region. And in addition, by treating the input signal with filter circuits before high-order bit elimination, the probability of data overflow is further decreased.

DESCRIPTION OF THE PREFERRED EMBODIMENTS

Preferred embodiments of the present invention will now be described in detail.

Figure 1:
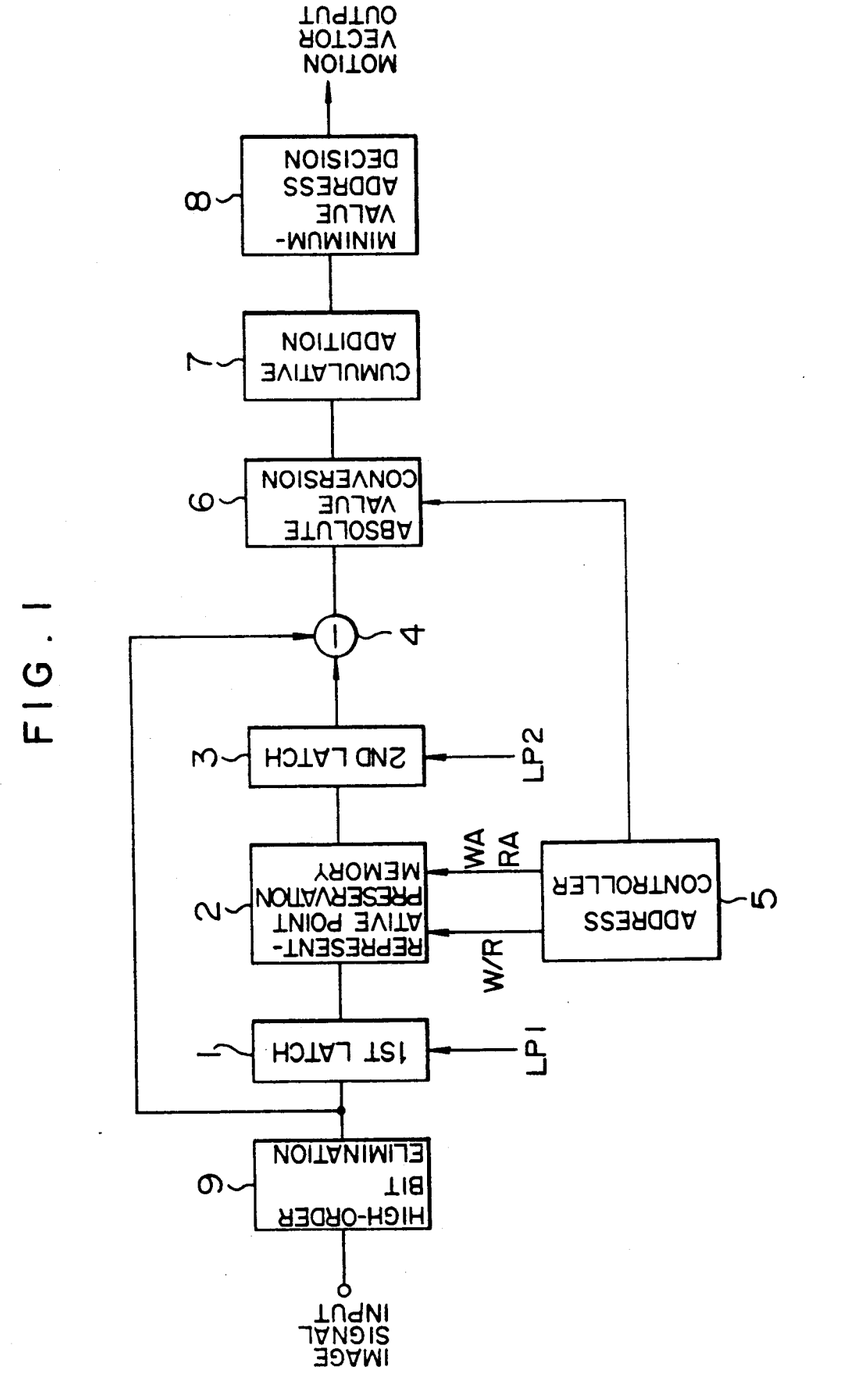
FIG. 1 is a block diagram of an image motion vector detecting apparatus using a first embodiment of the correlation computing device according to the present invention.

FIG. 1 is a block diagram of an image motion vector detecting apparatus using a first embodiment of the correlation computing device of the present invention for detecting an image motion vector according to the so-called representative point matching method. Referring to FIG. 1, the image motion vector detecting apparatus comprises a first latch 1, a representative point preservation memory 2, a second latch 3, a subtractor 4, an address controller 5, an absolute value conversion circuit 6, a cumulative adder 7, a minimum-value address decision circuit 8, and a high-order bit elimination circuit 9. The structure of the apparatus shown in FIG. 1 is the same as that of the apparatus shown in FIG. 7, except for the additional provision of the high-order bit elimination circuit 9.

The operation of the image motion vector detecting apparatus using the first embodiment of the correlation computing device of the present invention will now be described.

Referring to FIG. 1, high-order bits of an image data input signal are eliminated by the high-order bit elimination circuit 9. The output signal of the high-order bit elimination circuit 9 is applied to the first latch 1 with the timing of the timing pulse signal LP1, and, under control of the write address signal WA applied from the address controller 5, the image data $S_{n-1}(X_k, Y_k)$ appearing at the k-th representative point in the (n−1)th field (or frame) are written in and stored at corresponding addresses for respective k values in the representative point preservation memory 2. In the n-th field (or n-th frame), the difference between the image data $S_n(X_{k+i}, Y_{k+j})$ for each picture element around the k-th representative point and the image data $S_{n-1}(X_k, Y_k)$ stored in the representative point preservation memory 2 is computed by the subtractor 4, and the absolute value conversion circuit 6 generates the absolute difference and supplies the absolute difference data to the cumulative adder 7, by which the absolute difference data calculated for each picture element at a location having the same coordinate value (i, j) on the relative coordinates fixed to the representative points in respective motion vector detecting regions are added together. After completion of the cumulative addition of the absolute difference data for all the motion vector detecting regions, a set of cumulative absolute differences, or correlations, P(i, j) are obtained, and the minimum-value address decision circuit 8 decides the location (i, j) where the minimum value of P(i, j) is held in the cumulative adder 7. In the case of the decision of correlation on the basis of the cumulative absolute difference P(i, j), the higher the correlation, the smaller the value of P(i, j). Therefore, when the position (address) of each of the representative points is taken as the reference, the distance and direction between the representative point and the position (address) where the cumulative absolute difference P(i, j) exhibits the minimum value indicates the motion vector.

Logical and arithmetic processing of the image data input signal whose high-order bits are eliminated by the high-order bit elimination circuit 9 will now be discussed.

Figure 2:
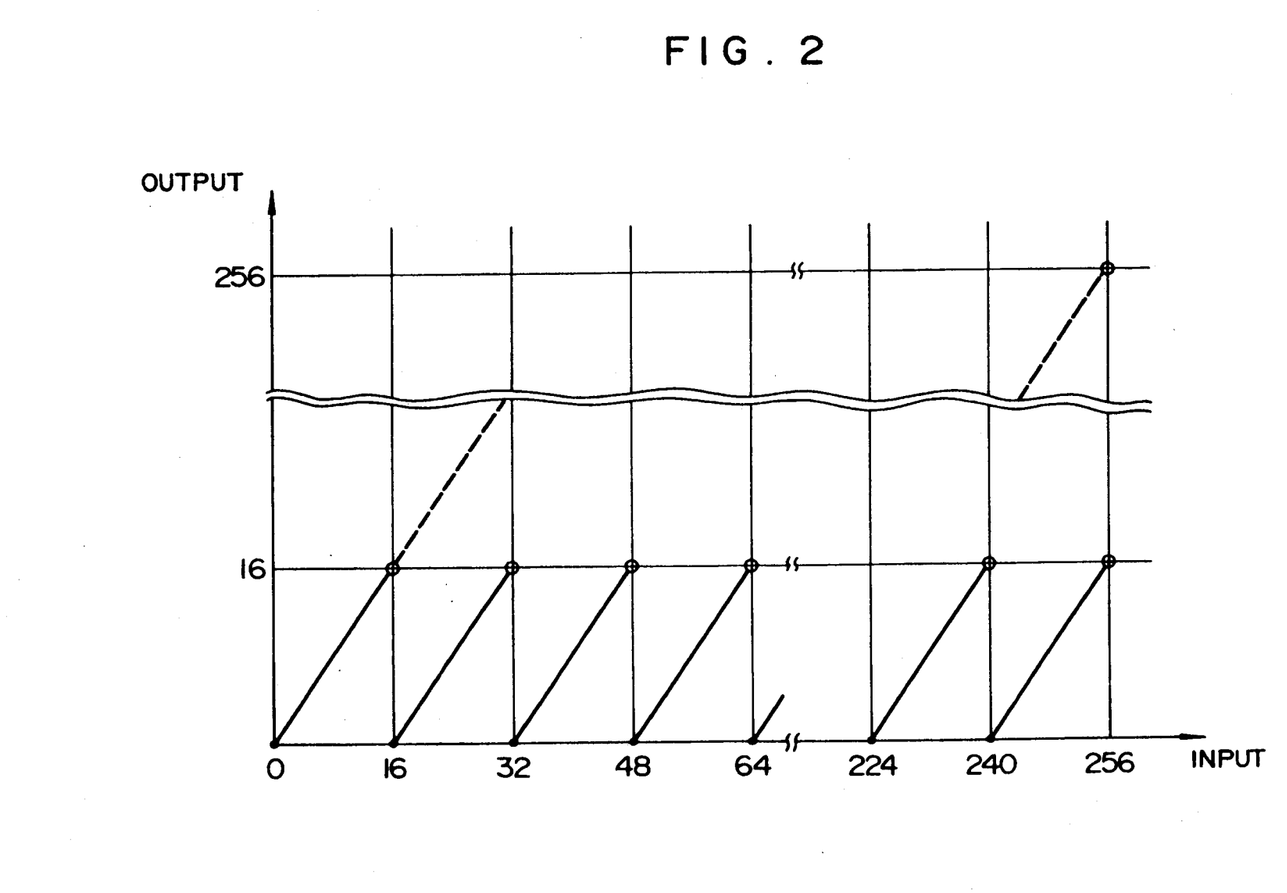
FIG. 2 is a graph showing the relation between the input and the output of the high-order bit elimination circuit when the high-order bit elimination circuit in the first embodiment eliminates high-order four bits out of an 8-bit input signal.

Suppose, for example, that the image data input signal consists of 8 bits, and its four high-order bits are eliminated by the high-order bit elimination circuit 9. FIG. 2 is a graph showing the relation between the input and the output of the high-order bit elimination circuit 9. It is primarily a conventional practice to eliminate low-order bits out of an input signal thereby preventing occurrence of data overflow in order to reduce the word length. In contrast to such a conventional practice, the present invention is featured by the fact that high-order bits of an input signal are eliminated, and occurrence of data overflow is permitted. That is, as seen in FIG. 2, the high-order bit elimination circuit 9 has an input-output characteristic which is sawtooth-like and discontinuous. The broken line in FIG. 2 represents the primary input-output characteristic exhibited when the high-order bits are not eliminated. Because of the provision of the high-order bit elimination circuit 9 having the input-output characteristic shown in FIG. 2, the word length can be reduced without giving rise to lowering of the accuracy of computation which is encountered when low-order bits of an input signal are eliminated.

A problem that may arise due to elimination of the high-order bits of the input signal is how computation is adversely affected by occurrence of data overflow. This problem will now be discussed.

Figure 3:
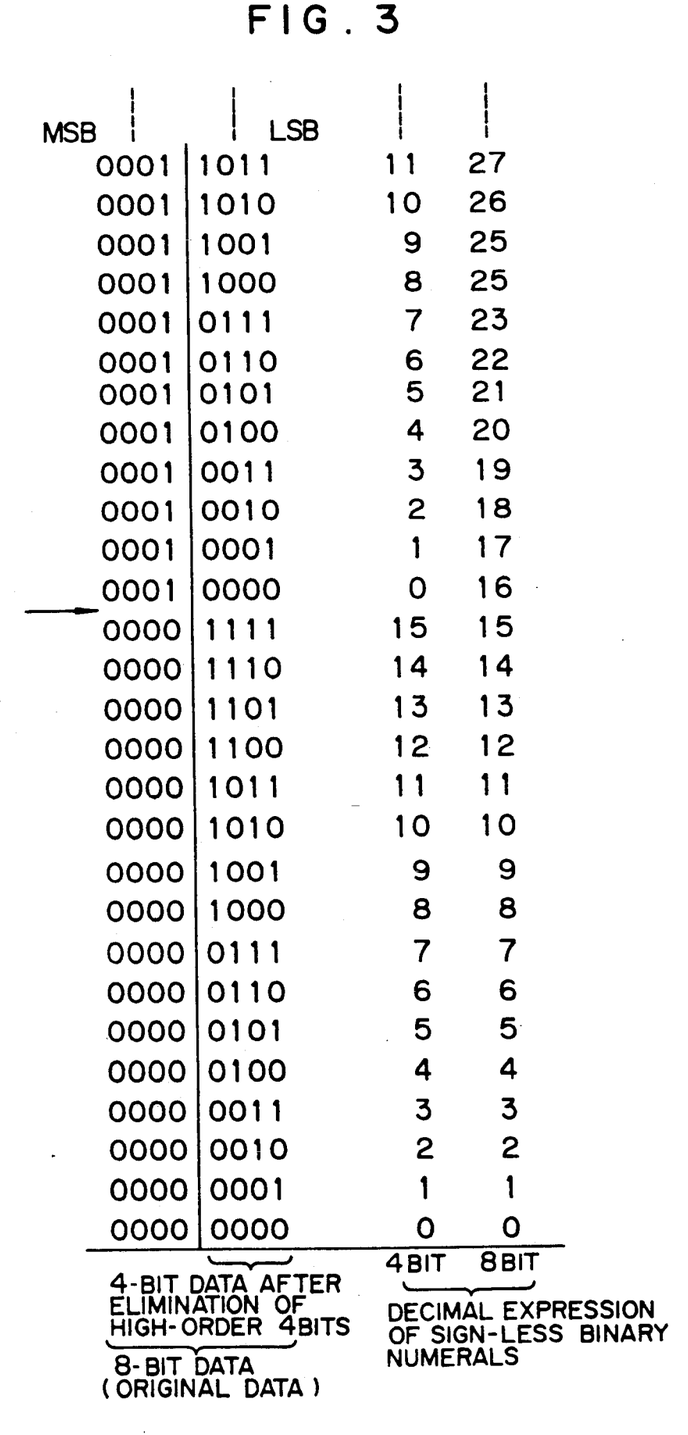
FIG. 3 shows binary and decimal representations of the numerals shown, in FIG. 2.

FIG. 3 shows part of binary and decimal representations of numerals when the four high-order bits out of 8-bit are eliminated by the high-order bit elimination circuit 9. The arrow in FIG. 3 indicates that the decimal numerals become discontinuous when the four high-order bits out of 8-bit are eliminated at that position. It will be seen in FIG. 3 that, when the four high-order bits out of 8-bit are eliminated, the resultant decimal numeral changes cyclically between "0" and "15".

Figure 4:
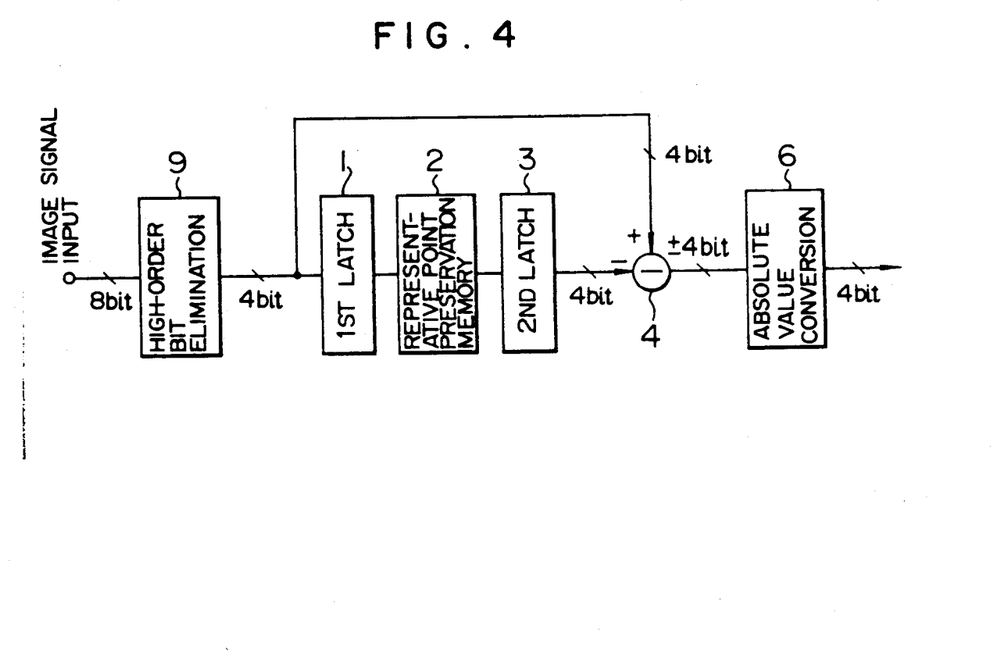
FIG. 4 is a block diagram showing the structure of the correlation computing device in FIG. 1.

FIG. 4 shows the structure of the correlation computing device in which four high-order bits out of an 8-bit data input signal are eliminated, and, on the basis of the resultant data, correlation is computed by computing an absolute difference between them. That is, the manner of computation in the correlation computing device comprises eliminating the four high-order bits out of the data input signal (consisting of positive eight bits) generated in one field, eliminating the four high-order bits out of the data input signal generated in the next field and computing the absolute difference between those data. In this case, a 4-bit full adder is used as the subtractor 4 and generates an output of ±4 bits in which the MSB is an inverted carry output.

More precisely, the manner of computation comprises eliminating high-order bits out of two data input signals, and, in order to compute the correlation between them, the 2's complement of one of the signals is computed (by inverting all the bits and adding a "1" to the result of inversion) and added to the other signal. Then, whether the result of addition is positive or negative is decided on the basis of the MSB of the result of addition, and, when the result of addition is negative, the absolute value of the result of addition is taken. The above manner of computing the absolute difference is the same as the customary manner of computation except that the high-order bits of input data signals are eliminated.

The result of computation according to such a manner of computation will now be discussed. Application of data inputs, for example, "0" to "15" to the device does not pose any practical problem, because they are continuous data, and the absolute difference is between "0" and "15". Consider then the case of computation of the absolute difference between, for example, "16" and "15" in terms of eight bits, which data are located on opposite sides of the point of data discontinuity indicated by the arrow in FIG. 3.

(1) Computation of abs (16 − 15), where "abs" designates an operator for computing the absolute difference:

The term (16 − 15) is equivalent to addition of the 2's complement of "15" to "16". Therefore, "15" (1111) is first inverted into the 1's complement (0000), and after addition of this (0000) to "16" (0000), a "1" is added to the result of addition, as follows:

| 0000 | "16" ("16" is expressed as "0000" due to occurrence of an overflow.) |
| (+) 0000 | Inversion of "15" (A flag bit need not |
| 00000 | be used.) |
| (+) 0001 | A "1" is further added. |
| 0001 | |
| 0001 | The absolute value is determined depending on the value of the MSB. (Answer) |

(when MSB=0, the absolute value is not changed, while when MSB=1, the absolute value is inverted, and a "1" is added.)

(2) Computation of abs (15 − 16), where "abs" designates the operator for computing the absolute value of the difference:

The term (15 − 16) is equivalent to addition of the 2's complement of "16" to "15". Therefore, "16" (expressed as (0000) due to occurrence of an overflow) is inverted, that is, turned into its 1's complement (1111), and after addition of this (1111) to "15" (1111), a "1" is added to the result of addition, as follows:

| 1111 | "15" |
| (+) 1111 | Inversion of "16" (A flag bit need not be |
| 11110 | used.) |
| (+) 00001 | A "1" is further added. |
| 11111 | |
| 0001 | The absolute value is determined depending on the value of the MSB. |

Thus, even when the absolute difference between two data located on opposite sides of the point of data discontinuity indicated by the arrow in FIG. 3 is computed, no discontinuity occurs in the result of computation, provided that the number of bits of the answer is less than or equal to four.

As described above, the number of bits of the answer cannot exceed four. Therefore, when the absolute difference between two data distant from each other by more than four bits, that is, "16" in terms of 8-bit data input signals, is computed, an overflow occurs in the result of computation as in the case of FIG. 2. However, in the case of the representative point matching method applied to the detection of an image motion vector, limitation of the absolute difference data does not pose any special problem, for the reasons which will be described below.

Figure 5:
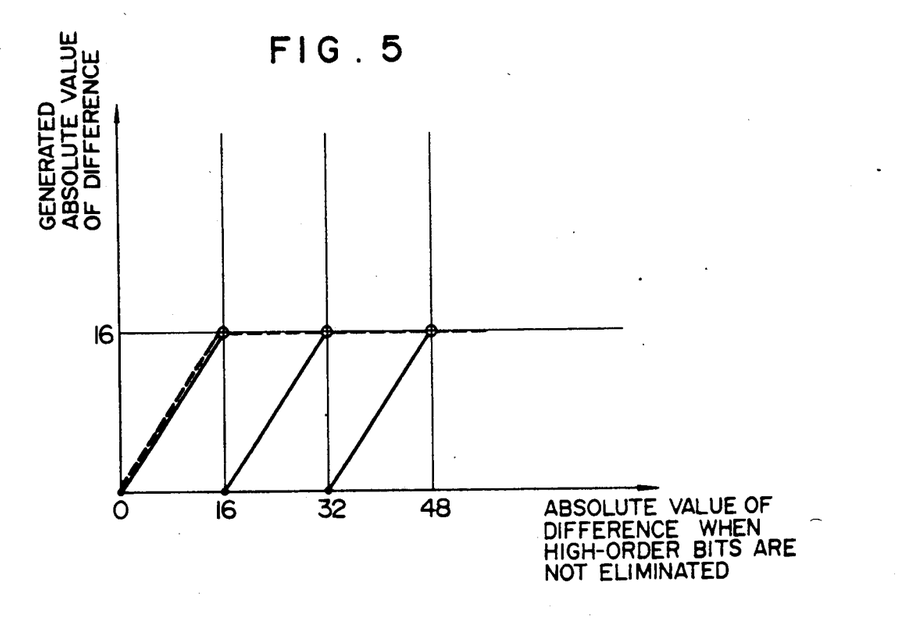
FIG. 5 is a graph illustrating the limiter action made in the first embodiment.

According to the representative point matching method, cumulative absolute difference data spatially near its minimum value data show a gradual increase around the minimum value. In addition, cumulative absolute difference data having a value exceeding a certain limit will not be helpful for the purpose of finding the minimum value. These characteristics of the present invention are substantially equivalent to the results of a usual limitation imposed on signals having values exceeding the limit so as to reduce the scale of the signal processing circuit. However, the present invention differs in its substantial limiter action from the usual limiter action in that the limiting value is not constant (for example, "15" with 4 bits) but changes cyclically due to overflow. FIG. 5 shows the characteristics of the absolute value conversion circuit combined with the high-order bit elimination circuit of the present invention, where solid line represents the characteristics of the present invention, and broken line shows the usual limiter characteristics.

When, in the manner described above, the limiting value is cyclically changed due to overflow, such a problem may arise that data which should primarily have a large value may have a small value, and data which have not any correlation therebetween may be regarded as having correlation. However, this problem can be substantially solved when the number of bits eliminated by the high-order bit elimination circuit 9 is adjusted so that the level of overflow occurrence is selected to be higher than the level of the output of the absolute value conversion circuit 6 for actual image data inputted, and thus, to minimize the probability of data overflow.

Thus, according to the first embodiment described above, high-order bits of image data input signals are eliminated so as to reduce the circuit scale without lowering the accuracy of computation.

Figure 6:
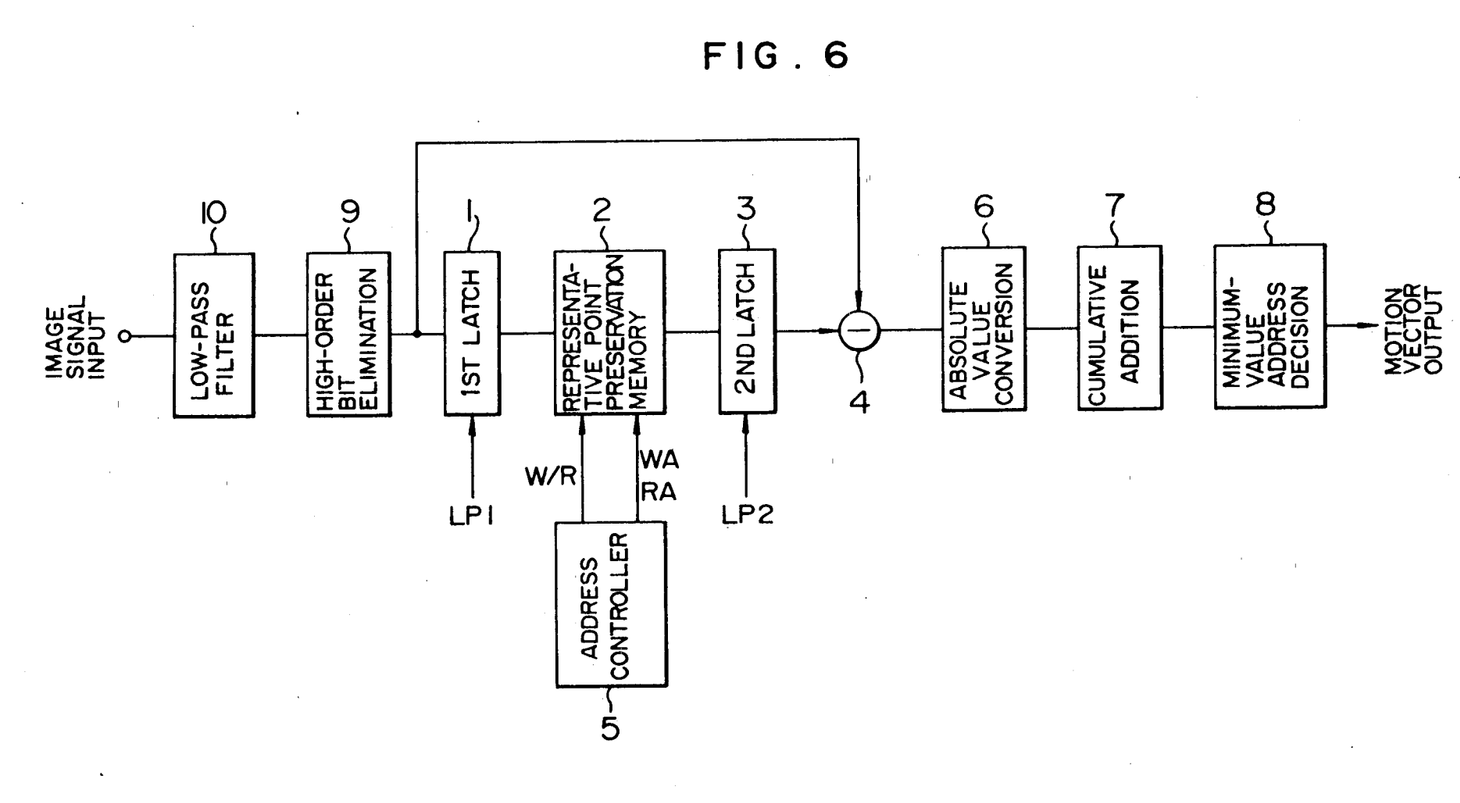
FIG. 6 is a block diagram of an image motion vector detecting apparatus using a second embodiment of the present invention.

FIG. 6 is a block diagram of an image motion vector detecting apparatus using a second embodiment of the correlation computing device of the present invention for detecting an image motion vector according to the representative point matching method. Referring to FIG. 6, the image motion vector detecting apparatus comprises a first latch 1, a representative point preservation memory 2, a second latch 3, a subtractor 4, an address controller 5, an absolute value conversion circuit 6, a cumulative adder 7, a minimum-value address decision circuit 8, a high-order bit elimination circuit 9, and a low-pass filter circuit 10. The structure of the apparatus shown in FIG. 6 is the same as that of the apparatus shown in FIG. 1, except for the additional provision of the low-pass filter circuit 10.

The operation of the image motion vector detecting apparatus using the second embodiment of the correlation computing device of the present invention will now be described.

Referring to FIG. 6, an image data input signal is passed through the low-pass filter circuit 10 so as to suppress an abrupt signal change. Thus, the image data input signal changes smoothly. Then, the high-order bit elimination circuit 9 eliminates high-order bits of the output signal of the low-pass filter circuit 10. Suppose that the magnitude of the image motion vector is the same as that in the first embodiment, then, the image data signal changes more smoothly in the second embodiment, as it is passed through the low-pass filter circuit 10 and its high-order bits are then eliminated by the high-order bit elimination circuit 9. Therefore, the absolute difference between image data is less than that in the first embodiment, and the probability of data overflow in the output of the absolute value conversion circuit 6 is less than that in the first embodiment, so that the image motion vector can be detected with a minimized error.

The operation of the high-order bit elimination circuit 9 in this second embodiment is the same as that of the circuit 9 in the first embodiment. Referring to FIG. 6, the output signal of the high-order bit elimination circuit 9 is applied to the first latch 1 with the timing of the timing pulse signal LP1, and, under control of the write address signal WA applied from the address controller 5, the image data $S_{n-1}(X_k, Y_k)$ appearing at k-th representative point in (n−1)th field (or frame) are written in and stored at corresponding addresses for respective k value in the representative point preservation memory 2. In the n-th field (or n-th frame), the difference between the image data $S_n(X_{k+i}, Y_{k+j})$ for each picture element around the k-th representative point and the image data $S_{n-1}(X_k, Y_k)$ stored in the representative point preservation memory 2 is computed by the subtractor 4, and the absolute value conversion circuit 6 generates the absolute difference and supplies the absolute difference data to the cumulative adder 7, by which the absolute difference data calculated for each picture element at a location having the same coordinate value (i, j) on the relative coordinates fixed to the representative points in respective motion vector detecting regions are added together. After completion of the cumulative addition of the absolute difference data for all the motion vector detecting regions, a set of cumulative absolute differences, or correlations, P(i, j) are obtained, and the minimum-value address decision circuit 8 decides the location (i, j) where the minimum value of P(i, j) is held in the cumulative adder 7. In the case of the decision of correlation on the basis of the cumulative absolute difference P(i, j), the higher the correlation, the smaller the value of P(i, j). Therefore, when the position (address) of each of the representative points is taken as the reference, the distance and direction between the representative point and the position (address) where the cumulative absolute difference P(i, j) exhibits the minimum value indicates the motion vector.

It will be seen from the above description of the second embodiment that the low-pass filter circuit 10 is disposed before the high-order bit elimination circuit 9 so that an image data input signal is processed after suppressing an abrupt change of the input signal, that is, smoothing the input signal. Therefore, when the magnitude of the motion vector in the second embodiment is the same as that in the first embodiment, and, after elimination of high-order bits out of image data input signals, the absolute difference between the image data is computed to find the correlation, the probability of data overflow in the output of the absolute value conversion circuit 6 is less than that in the first embodiment, so that the image motion vector can be detected with a minimized error.

In lieu of the low-pass filter circuit 10 employed in the second embodiment, a high-pass filter circuit may be used to suppress the low frequency components down to the direct current component of the input signal so as to exhibit the similar effect, or a band-pass filter circuit may be used to suppress high frequency components as well as low frequency components of the input signal so as to exhibit the similar effect. Further, in the absolute value conversion circuit 6 in each of the first and second embodiments, data bits of a input data are inverted, and a "1" is added to the inverted bits when a negative input data is applied. However, in view of a small error that may occur, a "1" need not be added. Further, the inputs to the subtractor 4 in each of the first and second embodiments may be expanded to more than the sum of one bit and the number of bits generated from the high-order bit elimination circuit 9. Further, in each of the first and second embodiments, the high-order bit elimination circuit 9 is inserted in the signal input stage. However, the high-order bit elimination circuit 9 may be inserted in each of the paths of the two inputs to the subtractor 4.

It will be understood from the foregoing detailed description that the correlation computing device according to the present invention is advantageous in that the circuit scale can be reduced without lowering the accuracy of detection of the image motion vector.

We claim:

1. A correlation computing device, comprising:
   a higher-order bit elimination means for receiving a digital input image signal and providing an output signal in which higher-order bits up to 50% have been eliminated as a maximum effective word length of a digital input image signal;
   a representative point preservation memory means for temporarily storing said output signal from said higher-order bit elimination means;
   a correlation determining means for determining a correlation between a signal stored in said representative point preservation memory means and said output signal from said higher-order bit elimination means; and
   a minimum-value address decision means for selecting a minimum value of said correlation computed by said correlation computing means and for determining a motion vector for the digital input image signal.

2. A correlation computing device according to claim 1, further comprising a low-pass filter circuit means having an output connected to an input of said higher-order bit elimination means, for removing steep change components in the digital input image signal prior to said digital input image signal being received by said higher-order bit elimination means.

3. A correlation computing device according to claim 1 further comprising a high-pass filter circuit means having an output connected to an input of said higher-order bit elimination means, for removing very slow change components in the digital input image signal, prior to said digital input image signal being received by said high-order bit elimination means.

4. A correlation computing device according to claim 1, further comprising a band-pass filter circuit means having an output connected to an input of said higher-order bit elimination means, for removing both steep change components and very slow change components in the digital input image signal prior to said digital input image signal being received by said higher-order bit elimination means.

* * * * *